United States Patent
Han

(10) Patent No.: US 8,009,952 B2
(45) Date of Patent: Aug. 30, 2011

(54) PLASTIC PHOTONIC CRYSTAL FIBER FOR TERAHERTZ WAVE TRANSMISSION AND METHOD FOR MANUFACTURING THEREOF

(75) Inventor: Hae-Wook Han, Seoul (KR)

(73) Assignee: Postech Academy-Industry Foundation, Gyeongsangbuk-Do (KR)

( * ) Notice: Subject to any disclaimer, the term of this patent is extended or adjusted under 35 U.S.C. 154(b) by 1432 days.

(21) Appl. No.: 11/494,479

(22) Filed: Jul. 28, 2006

(65) Prior Publication Data

US 2006/0263022 A1 Nov. 23, 2006

Related U.S. Application Data

(62) Division of application No. 10/296,225, filed as application No. PCT/KR01/01038 on Jun. 18, 2001, now Pat. No. 7,106,933.

(30) Foreign Application Priority Data

Aug. 6, 2001 (KR) .................................. 2001-31977

(51) Int. Cl.
G02B 6/032 (2006.01)
G02B 6/02 (2006.01)

(52) U.S. Cl. ........................................ 385/125; 385/123

(58) Field of Classification Search ........... 385/123–128
See application file for complete search history.

(56) References Cited

U.S. PATENT DOCUMENTS 6,243,522 B1 6/2001 Allan et al.
6,301,420 B1 * 10/2001 Greenaway et al. .......... 385/126

FOREIGN PATENT DOCUMENTS

| | | |
|---|---|---|
| JP | 2000-68577 | 3/2000 |
| JP | 2000-111746 | 4/2000 |
| JP | 2000-332333 | 11/2000 |
| JP | 2001-60922 | 3/2001 |
| JP | 2001-332101 | 11/2001 |
| JP | 2004-527007 | 9/2004 |
| WO | WO 99/64903 | 12/1999 |
| WO | 00/60388 | 10/2000 |

(Continued)

OTHER PUBLICATIONS

R. Mendis et al. "Plastic ribbonTHz waveguides", J. of Applied Physics, vol. 88, No. 7, Oct. 1, 2000, pp. 4449-4451, XP12051760, cited in the application(added in annex).

(Continued)

*Primary Examiner* — Jamara A Franklin
(74) *Attorney, Agent, or Firm* — Bacon & Thomas, PLLC

(57) ABSTRACT

The present invention relates to a plastic photonic crystal fiber for terahertz wave transmission and a method for the manufacturing thereof. More particularly, the present invention is directed to a plastic photonic crystal fiber that can be easily manufactured and has low loss characteristics to be used as a waveguide of terahertz waves. The plastic photonic crystal fiber includes a crystal defect component having a longitudinal axis and a photonic crystal component surrounding the crystal defect component. The photonic crystal component has an array of a plurality of plastic elements having longitudinal axes and forming a 2-dimensional photonic crystal structure with a predetermined lattice constant. Further, the plastic photonic crystal fiber of the present invention can be used as a preform from which a plastic photonic crystal fiber for an optical communication (400-800 nm) can be drawn.

11 Claims, 11 Drawing Sheets

FOREIGN PATENT DOCUMENTS

WO     WO 01/84198 A1     11/2001
WO     WO 02/16984 A1     2/2002

OTHER PUBLICATIONS

S.P. Jamison et al. "Single-mode waveguide propagation and reshaping of sub-ps terahertz pulses in sapphire fibers" Appl. Phys. Letters vol. 76, No. 15, Apr. 10, 2000, pp. 1987-1989, cited in the application.

G.W. Chantry, et al., "Far Infrared and Millimetre-Wave Absorption Spectra Of Some Low-Loss Polymers", Chemical Physics Letters, Aug. 15, 1971, vol. 10, No. 4, pp. 473-477.

Zubia, J. et al., "Design and characterization of plastic optical fiber active coupler" In: IEEE Photonics Technology Letters: IEEE, Nov. 1998, vol. 1011, pp. 1578-1580.

Mangan, B.J. et al., "Dual-core photonic crystal fibre" In: IEEE Lasers and Electro-Optics, 1999, CLEO '99. Summaries of Papers Presented at the Conference on, 1999, pp. 559-560.

Barkou, S.E. et al., "Dispersion properties of photonic bandgap guiding fibers" In: IEEE Optical Fiber Communication Conference, 1999, and the International Conference on Integrated Optics and Optical Fiber Communication, OFC/IOOC '99, Technical Digest, 1999, vol. 4, pp. 117-119.

\* cited by examiner

PLASTIC PHOTONIC CRYSTAL FIBER FOR TERAHERTZ WAVE TRANSMISSION AND METHOD FOR MANUFACTURING THEREOF

This application is a divisional application of pending U.S. application Ser. No. 10/296,225, filed Dec. 4, 2002 (of which the entire disclosure of the pending, prior application is hereby incorporated by reference).

FIELD OF THE INVENTION

The present invention relates to a plastic photonic crystal fiber (hereinafter referred to as PPCF) for a terahertz (THz) wave transmission and a method for manufacturing same; and, more particularly, to an easily fabricable plastic photonic crystal fiber with a low loss characteristic to be used as a waveguide for transmitting a THz wave or a photon and, further, a method for manufacturing same.

BACKGROUND OF THE INVENTION

A photonic crystal refers to a structure in which dielectrics are regularly arranged in a manner to form a photonic band gap, thereby selectively passing or blocking an electromagnetic wave having a certain wavelength.

In recent years, many attentions have been directed to a low-loss waveguide for use in a frequency band of about 0.1 to 10 THz, which falls within a far infrared range. However, since conventional THz devices or measurement systems do not have a proper THz waveguide for the THz wave range, they transmit a THz wave into the air by using an expensive mirror or lens having, in general, a large volume. As such, several researches have been carried out to develop a low-loss THz waveguide using a metal (G. Gallot et al., J. Opt. Soc., vol. 17, p. 851, 2000), a sapphire fiber (S. P. Jamison et al., Appl. Phys. Lett., vol. 76, p. 1987, 2000) and a plastic ribbon (R. Mendis et al., J. Appl. Phys., vol. 88, p. 4449, 2000).

In the meantime, researches on a new waveguide using a photonic crystal fiber (hereinafter referred to as PCF) made of silica have been conducted throughout the world. The PCF is designed to have new characteristics that are hardly found in a conventional optical fiber. Such new characteristics include, e.g., a single mode characteristic across a wide range of frequency band (T. A. Birks et al., Opt. Lett., vol. 22, p. 961, 1997) and an air guiding characteristic exhibiting a very small transmission loss (R. F. Cregan, Science, vol. 285, p. 1537, 1999) (WO 00/37974, WO 99/64903).

However, the above-cited waveguide made of the metal, the sapphire or the plastic ribbon still exhibits a great attenuation, and, further, it is very difficult to produce a physically flexible THz waveguide by using those materials. The silica PCF also reveals the same problems when it is designed to fit the THz frequency band. Accordingly, a plastic PCF (hereinafter referred to as PPCF) capable of overcoming such drawbacks of the prior art and also improving low loss characteristic at the THz frequency band is very much in need to be developed.

SUMMARY OF THE INVENTION

It is, therefore, an object of the present invention to provide an easily fabricable and a cost-effective plastic photonic crystal fiber (PPCF) having a low loss characteristic adequate for producing a flexible waveguide for use in a THz frequency band, and a method for manufacturing same. Further, the present invention provides a preform for a PPCF for use in an optical communication.

In accordance with one aspect of the present invention, there is provided a PPCF including a crystal defect component having a longitudinal axis; and a photonic crystal component surrounding the crystal defect component, wherein the photonic crystal component includes an array of a plurality of plastic elements having a longitudinal axis and forming a 2-dimensional (2D) photonic crystal structure whose cross-section perpendicular to the longitudinal axis has a predetermined lattice constant.

In accordance with another aspect of the present invention, there is provided a method for fabricating a PPCF, including the steps of: (a) preparing at least one crystal defect component member having a longitudinal axis and a predetermined diameter; (b) preparing a plurality of plastic elements having a longitudinal axis and a predetermined diameter; (c) arranging the plurality of plastic elements in such a manner as to surround said at least one crystal defect component member, forming a 2D photonic crystal structure having a predetermined lattice constant; and (d) performing a heat-treatment at or over a predetermined temperature whereby neighboring ones among the plastic elements adhere to each other.

Herein, the PPCF fabrication method further includes a step (e) of removing the crystal defect component member, wherein in the step (d) the heat-treatment is preferably performed at or below a predetermined temperature whereby the crystal defect component member and the ambient plastic elements do not adhere to each other.

Further, it is preferable that the crystal defect component member has a surface featuring a low adhesiveness and a low abrasiveness, and the step (e) includes a stage of taking out the crystal defect component member from an end thereof by using the low adhesiveness and the low abrasiveness of the surface.

Still further, it is preferable that the crystal defect component member has at least either one of a polytetrafluoroethylene tube and a polytetrafluoroethylene filament.

In accordance with still another aspect of the present invention, there is provided a method for transmitting a THz wave through a PPCF, including the steps of: preparing the PPCF including a crystal defect component having a longitudinal axis and a photonic crystal component surrounding the crystal defect component, wherein the photonic crystal component includes an array of a plurality of plastic components forming a 2D photonic crystal structure whose cross-section perpendicular to the longitudinal axis has a predetermined lattice constant; and transmitting an electromagnetic wave within a THz wave range through the PPCF.

Herein, the plurality of plastic elements of the photonic crystal component are preferably made of plastic having an extinction coefficient of about $10^{-2}$ or less in the THz wave range.

Further, it is preferable that the plurality of plastic elements of the photonic crystal component are made of high-density polyethylene.

Furthermore, it is preferable that the plurality of plastic elements of the photonic crystal component has either one of a plurality of plastic tubes and a multiplicity of plastic filaments.

Still further, it is preferable that the 2D photonic crystal structure of the photonic crystal component has the predetermined lattice constant smaller than several millimeters.

Still further, it is preferable that the 2D photonic crystal structure of the photonic crystal component is of a triangular lattice type, a square lattice type, a honeycomb lattice type or a Kagome lattice type.

Still further, it is preferable that the photonic crystal component further includes extra plastic elements having a radius or a thickness different from those of the plurality of plastic elements forming the lattice structure, the extra plastic element being inserted into each of interstitial positions of the lattice structure whereby a modified 2D photonic crystal structure is obtained.

Still further, the crystal defect component may have a refractive index lower than that of the photonic crystal component.

Still further, the size of a cross-section of the crystal defect component with a lower refractive index is preferably equal to or larger than the size of a cross-section of a unit including at least one central element and six ambient elements surrounding the central element in the 2D photonic crystal structure.

Still further, the crystal defect component may have a refractive index higher than that of the photonic crystal component.

Still further, it is preferable that the crystal defect component with a higher refractive index includes at least one plastic element having an extinction coefficient of about $10^{-2}$ or less in a THz frequency range.

Still further, the plastic element forming the crystal defect component is preferably at least one high-density polyethylene tube or filament.

In accordance with still another aspect of the present invention, there is provided a preform for a PPCF comprising: a crystal defect component having a longitudinal axis; and a photonic crystal component surrounding the crystal defect component, wherein the photonic crystal component includes an array of a plurality of plastic elements having a longitudinal axis and forming a 2D photonic crystal structure whose cross-section perpendicular to the longitudinal axis has a predetermined lattice constant.

Herein, it is preferable that the plurality of plastic elements of the photonic crystal component are made of plastic exhibiting an attenuation coefficient of about 1000 dB/km or less in a frequency band ranging from 400 nm to 800 nm.

Further, the plurality of plastic elements of the photonic crystal component are preferably made of polymethylmethacrylate (PMMA), polystyrene or polycarbonate.

Still further, it is preferable that the crystal defect component may have a refractive index higher than that of the photonic crystal component.

Still further, it is preferable that the crystal defect component includes at least one plastic element having an attenuation coefficient of about 1000 dB/km or less in a frequency band ranging from 400 nm to 800 nm.

Still further, it is preferable that the plastic element has at least one tube or filament made of polymethylmethacrylate (PMMA), polystyrene or polycarbonate.

BRIEF DESCRIPTION OF THE DRAWINGS

The above and other objects and features of the invention will become apparent from the following description of preferred embodiments given in conjunction with accompanying drawings, in which.

Figure 1A:
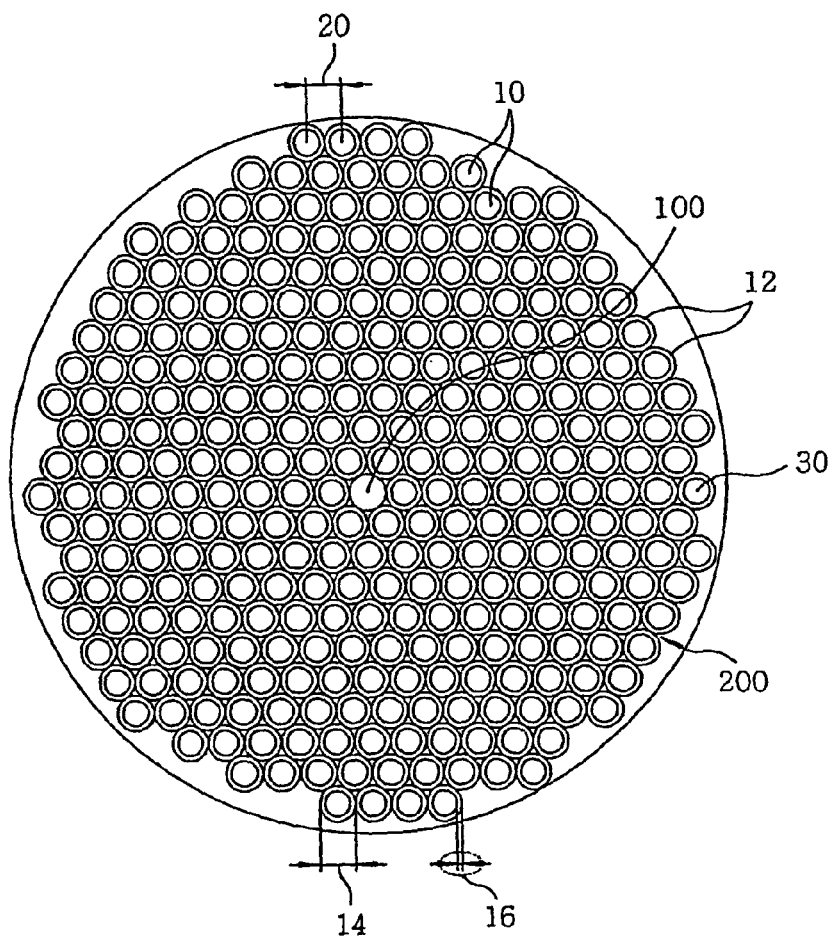
FIG. 1A describes a plastic photonic crystal fiber (PPCF) in accordance with a first preferred embodiment of the present invention and FIG. 1B shows a structure of the photonic crystal fiber having a photonic crystal component surrounding a crystal defect component.

DESCRIPTION OF REFERENCE NUMERALS USED IN DESCRIBING COMPONENTS SHOWN IN THE ACCOMPANYING DRAWINGS

100: crystal defect component
200: photonic crystal component
10: inside of plastic element
12: outside of plastic element
14: outside diameter of plastic element
16: thickness of wall of plastic element
20: lattice constant
30: a plurality of plastic elements
40: a plurality of plastic filaments
130: plastic elements comprising a basic lattice
132: auxiliary plastic elements

DETAILED DESCRIPTION OF THE PREFERRED EMBODIMENTS

Referring to FIG. 1A, there is illustrated a plastic photonic crystal fiber (PPCF) in accordance with a first preferred embodiment of the present invention. The PPCF includes a crystal defect component 100 and a photonic crystal component 200. The photonic crystal component 200 has a 2-dimensional (2D) photonic crystal structure having a predetermined lattice constant.

Figure 1B:
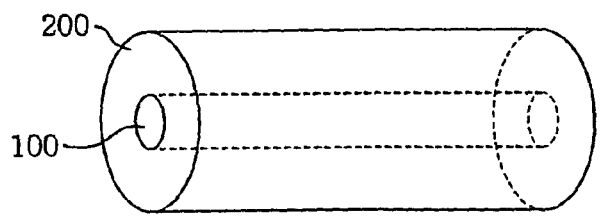

FIG. 1B shows the photonic crystal component 200 surrounding the crystal defect component 100. Though a single transmission route is formed by the single crystal defect component 100 prepared at the center of the fiber as shown in FIG. 1A, it is also possible to form the crystal defect component 100 with a plurality of filaments. In fact, the number of crystal defect components 100 is not a technical essence of the present invention, and, thus, can be varied depending on the necessity. Further, the crystal defect component 100 can be made of tubes, instead of the filaments, thicker than tubes used to form the photonic crystal component 200. That is, since the only requirement for this PPCF structure is that the crystal defect component 100 has a refractive index greater than that of the photonic crystal component 200, various modifications can be made as long as this requirement is satisfied.

Figure 3A:
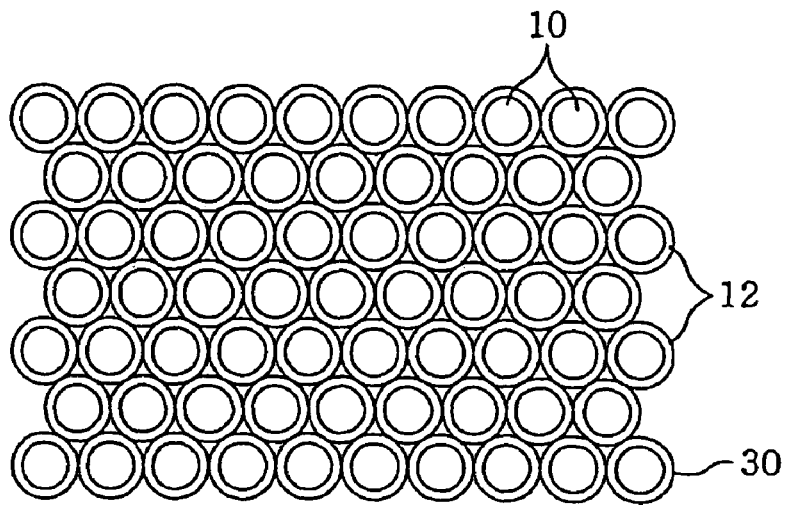
FIGS. 3A to 3F respectively illustrate a triangular lattice structure, a square lattice structure, a honeycomb lattice structure, a Kagome lattice structure, a modified triangular lattice structure further including elements inserted therein in the form of a honeycomb lattice structure, each of the elements having a smaller diameter, and another modified triangular lattice structure further including elements inserted therein in the form of a Kagome lattice structure, each of the elements having a smaller diameter.
Figure 3B:
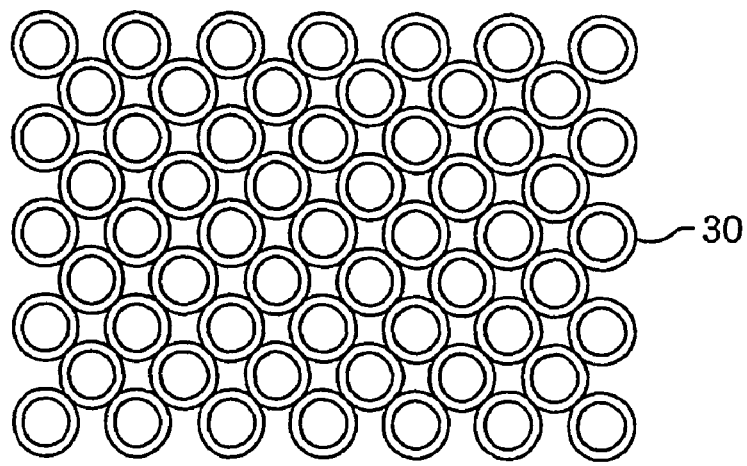
Figure 3C:
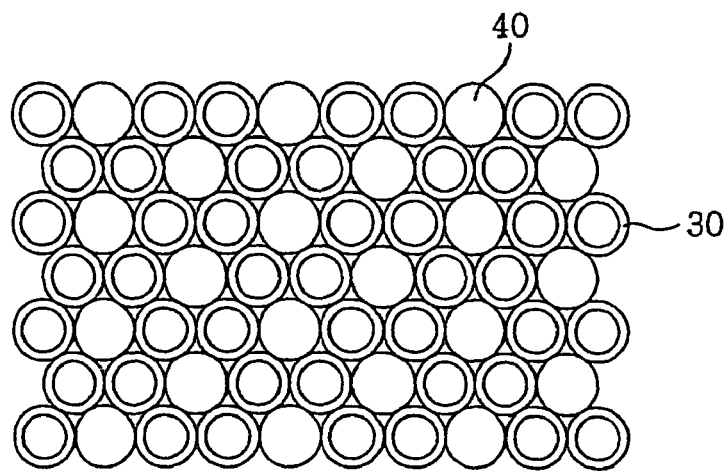
Figure 3D:
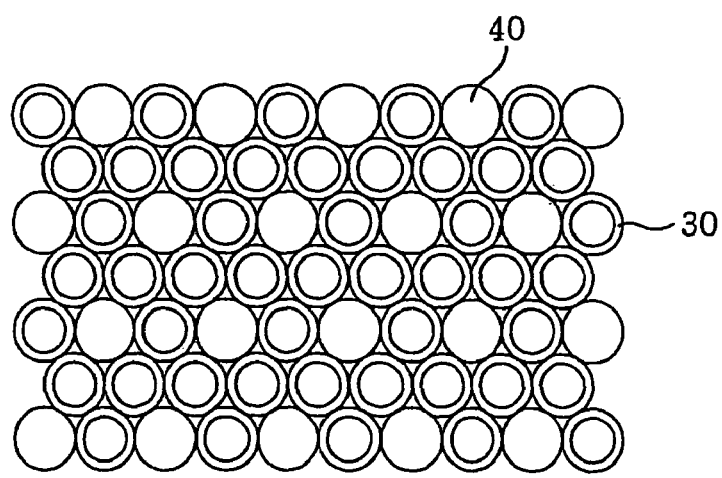
Figure 3E:
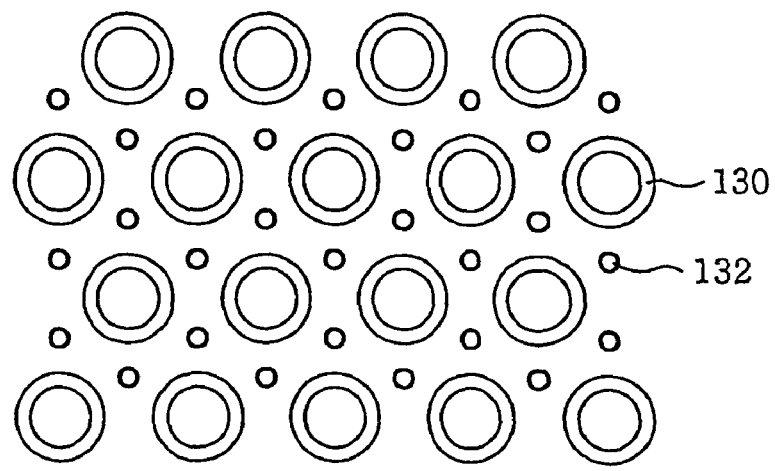
Figure 3F:
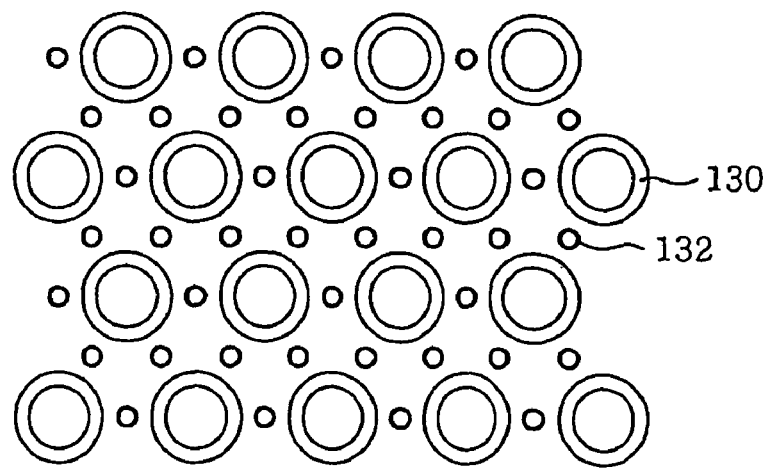

As shown in FIG. 1A, the photonic crystal component 200 is made of a plurality of plastic elements 30 that are regularly arranged by a predetermined lattice constant 20. In the first preferred embodiment shown in FIG. 1A, the plastic elements 30 are plastic tubes arranged in a triangular lattice structure. However, since difference of the lattice structure is not a critical element of the present invention, other photonic crystal lattice structures, such as a two-dimensional square lattice structure, a honeycomb lattice structure (J. Broeng et al., WO99/64903), a Kagome lattice structure (J. B. Nielson et al., Electronics Letters 35, pp 1736-1737, 1999), can be employed in lieu of the triangular lattice structure. In FIGS. 3A to 3D, there are respectively illustrated the triangular lattice structure, the square lattice structure, the honeycomb lattice structure and the Kagome lattice structure. The triangular lattice structure in FIG. 3A and the square lattice structure in FIG. 3B can be formed with either of a plurality of plastic tubes or of a multiplicity of plastic filaments while the honeycomb lattice structure in FIG. 3C and the Kagome lattice structure in FIG. 3D may be formed of either a combination of a plurality of plastic tubes having a different thickness or a combination of plastic filaments 40 and plastic tubes 30. Further, as shown in FIGS. 3E and 3F, it is also possible to obtain a modified 2D photonic crystal structure by adding into each of interstitial positions of the main lattice structure an element having a diameter and a thickness different from those of the tubes and/or the filaments forming the main lattice structure. Those added elements are preferably to form the honeycomb lattice structure or the Kagome lattice structure (Refer to WO99/64903).

In comparing the structures shown in FIGS. 1A and 1B with a conventional optical fiber for an optical transmission, the crystal defect component 100 and the photonic crystal component 200 correspond to a core and a cladding of the conventional optical fiber, respectively, the core serving to confine and transmit an optical signal and the cladding being prepared to surround the core.

The plastic elements forming the photonic crystal component 200 are preferably made of a plastic material having an extinction coefficient of about $10^{-2}$ or below in a THz wave range in order to provide a waveguide adequate for a low loss transmission of the THz waves. Accordingly, the smaller the absorption coefficient or the extinction coefficient of the employed plastic material is, the more efficient the waveguide can be. Such plastic materials can be, for example, transmissive optical materials widely employed in forming lenses used in the THz wave range, e.g., non-polar polymers such as polyethylene, polypropylene, polymethylpentene (TPX), polytetrafluoroethylene (Teflon) and polystyrene [Refer to: G. W. Chantry et al., Chemical Phys. Lett., vol. 10, p. 473 (1971), G. Gruner (ed.): Millimeter and submillimeter wave spectroscopy of solids, Topics in Applied Physics, vol. 74, p. 77 (Springer, Berlin, Heidelberg, N.Y. 1998)].

Particularly, among the above-mentioned various plastic materials, the polyethylene has an extinction coefficient of about $10^{-3}$ or less across the THz frequency range, thereby exhibiting a very low loss characteristic. In other words, the polyethylene has an absorption coefficient smaller than 0.2 $cm^{-1}$ at 1 THz [G. W. Chantry et al., Chemical Phys. Lett., vol. 10, p. 473. (1971)]. Thus, the present invention has been implemented by using high-density polyethylene.

In case a photonic band gap effect is employed to transmit an electromagnetic wave in the THz frequency range, the photonic crystal component 200 is required to have an appropriate lattice constant. For example, if the refractive index is hardly influenced by the variations of the wavelength, the lattice constant is determined in proportion to the wavelength. Consequently, it is preferable that the lattice constant has a value smaller than several millimeters to be applied all across the THz frequency range.

Accordingly, if two PCFs having the same lattice structure are used in an optical communication frequency band (wavelength of about 1.3 to 1.6 μm) and the THz frequency band, respectively, and if the refractive index of the first PCF in the optical communication frequency band is similar to that of the second PCF in the THz frequency band, the lattice constant of the second PCF is required to be tens to thousands of times greater than that of the first PCF. It is because the frequency of 0.1 to 1.0 THz corresponds to the wavelength ranging from 30 to 3000 μm. As can be seen from the above description, the PCF to be used in the THz frequency band needs to have a diameter tens to thousands times greater than that of the PCF of the prior art (PCT/DK99/00279) to be used in the frequency band for the current optical communications system. Thus, it is appropriate to use a flexible material such as polyethylene to produce a waveguide flexible in the THz frequency range.

In this first preferred embodiment of the present invention described so far, there exists no limit to the size of the crystal defect component 100 because light is confined into the crystal defect component by employing, as in the case of a conventional dielectric waveguide, a total internal reflection, not the photonic band gap effect. It is only required that the refractive index of the material forming the crystal defect component is higher than that of the surrounding cladding region.

Figure 2:
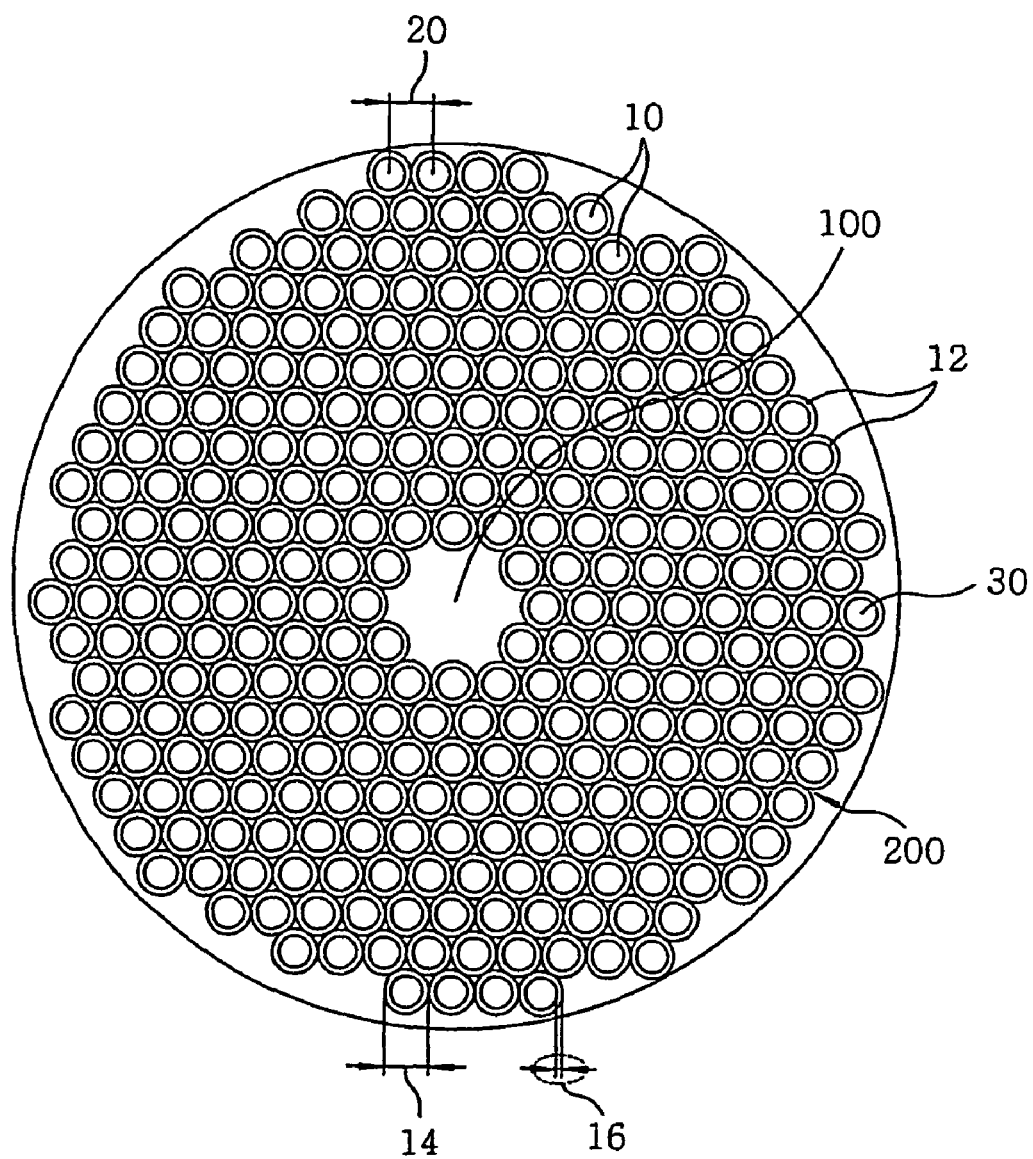
FIG. 2 shows a PPCF in accordance with a second preferred embodiment of the present invention.

Referring to FIG. 2, there is provided a PPCF in accordance with a second preferred embodiment of the present invention. The PPCF of the second embodiment also includes the crystal defect component 100 and the photonic crystal component 200, and the photonic crystal component 200 is arranged to form a 2D photonic crystal structure having a predetermined lattice constant.

The photonic crystal component 200 in the second embodiment is identical to the one explained in the first preferred embodiment of FIG. 1. Thus, a detailed description of the photonic crystal component 200 will be omitted. However, the crystal defect component 100 in the second embodiment is different from the one used in the first preferred embodiment in some respects. First, a guiding mechanism using the photonic band gap effect is employed to perform an optical transmission, unlike in the first embodiment. Further, the crystal defect component 100 is preferably prepared by taking out from the crystal lattice structure at least one element and its neighboring 6 elements, i.e., at least 7 elements, to obtain a guided mode for the optical transmission.

In such a case, the crystal defect component 100 can be filled with air like inside 10 of the individual plastic elements 30 (plastic tubes in the second preferred embodiment) of the photonic crystal component 200. Since the absorption coefficient in moisture-free air is extremely low, a THz waveguide having a highly improved low loss characteristic can be realized in accordance with the second embodiment of the present invention.

The crystal defect component 100 or the inside of the plastic tubes serving as the plastic elements 30 for the photonic crystal component 200 can also be filled with a gas, a liquid, or a solid, instead of the air, wherein the gas, the liquid, and the solid exhibit a certain optical characteristic, depending on the specific application, and the solid can be, for example, polymer.

Figure 4:
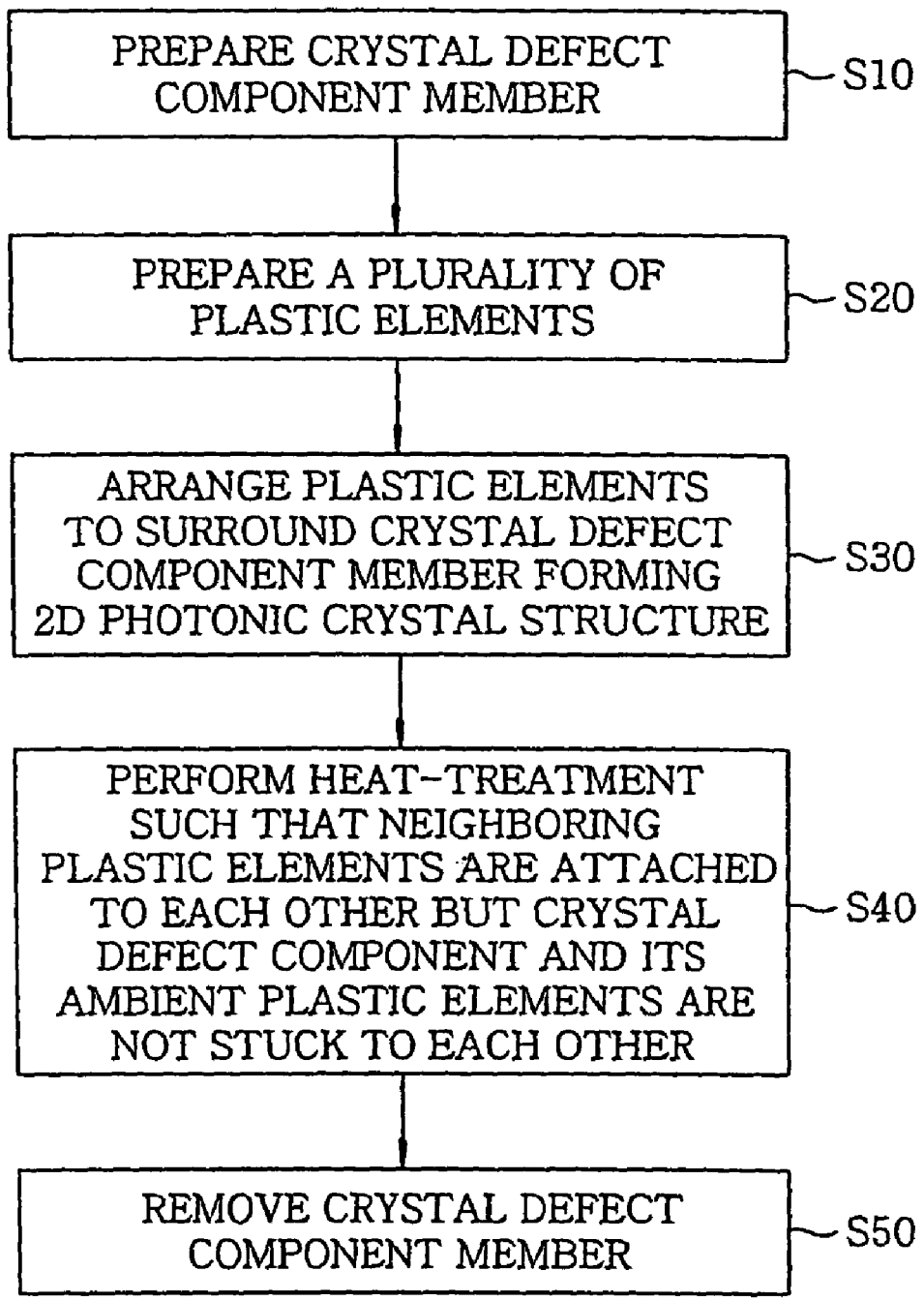
FIG. 4 provides a block diagram describing a method for fabricating a PPCF in accordance with a third preferred embodiment of the present invention.

Referring to FIG. 4, there is depicted a block diagram describing a process for fabricating a PPCF in accordance with a third embodiment of the present invention. First, a crystal defect component member is prepared to temporarily fill the crystal defect component 100 having a predetermined diameter (Step 10). Such crystal defect component member is, for example, a tube or a filament. Next, a plurality of plastic elements 30 having a predetermined diameter is prepared (Step 20) and the prepared plastic elements 30 are, then, arranged to surround the crystal defect component member, i.e., the tube and the filament, forming a 2D photonic crystal structure having a predetermined lattice constant (Step 30). Thereafter, a heat-treatment is performed in a manner that the neighboring plastic elements are attached to each other but the crystal defect component 100 and its ambient plastic elements are not stuck to each other (Step 40). Then, the crystal defect component member used to temporarily fill the crystal defect component 100 is removed (Step 50).

The third preferred embodiment of the present invention is directed to a photonic crystal fiber having a structure described in FIG. 2. In the step 30 of arranging the plastic elements around the crystal defect component member (i.e., plastic tubes in the third preferred embodiment), the plastic elements 30 are arrayed to have one of the earlier-described photonic crystal structures, e.g., a triangular lattice structure. The crystal defect component 100 is an essential element to fabricate a photonic crystal fiber to be used as a waveguide. The crystal defect component 100 can be classified into two types with respect to its refractive index. One is of a high index defect (hereinafter referred to as HID) type having a refractive index higher than that of the surroundings and the other is of a low index defect (hereinafter referred to as LID) type having a refractive index lower than that of the surroundings. In the third embodiment of the present invention, the crystal defect component 100 is implemented as an LID. First, filaments or tubes made of a material, e.g., polytetrafluoroethylene (Teflon), having a higher melting point than that of the plastic tubes, e.g., high-density polyethylene (hereinafter referred to as HDPE) tubes, are inserted into a portion where the crystal defect component 100 is to be located (Step 30). Then, the HDPE tubes are partially melted and adhere to each other by undergoing through a thermal fusion process where the whole structure is heated at about, for example, 137° C. for about an hour in an electric oven (Step 40). After the thermal fusion process, the polytetrafluoroethylene filament or tube is removed from the portion of the crystal defect component 100 (Step 50), so that an LID type photonic crystal structure having a center-positioned air hole serving as the crystal defect component 100 can be finally obtained. The reason why the polytetrafluoroethylene filament or tube can be easily taken out of the crystal structure is that the polytetrafluoroethylene has a very smooth surface and a much higher melting point (about 300° C. or greater) than the HDPE has.

The 'smooth' surface herein used means both 'low adhesiveness' and 'low abrasiveness'. Though the polytetrafluoroethylene is illustrated in the third embodiment, it is understood that other materials can also be used instead of the polytetrafluoroethylene. However, it should be noted that any alternative materials are required to satisfy several characteristics to be described hereinafter.

1) The melting point of the alternative material should be higher than that of the material forming the plastic elements 30 (e.g., polyethylene in the third embodiment) in the photonic crystal component 200 so that the alternative material is not melted during the thermal fusion process in the step 40.

2) The alternative material should have the 'low adhesiveness' and the 'low abrasiveness' characteristics so that it can be easily taken out of the crystal structure in the step 50, allowing the crystal defect component 100 to be successfully obtained. If a force stronger than a tensile strength of the filament, e.g., the polytetrafluoroethylene filament in the third embodiment, is required in order to remove the filament from the crystal structure, the filament may be cut while being taken out. Further, it may be emphasized that a careful handling is also required not to impair the plastic elements or the crystal structure of the photonic crystal structure 200 while the filament is taken out.

Figure 5:
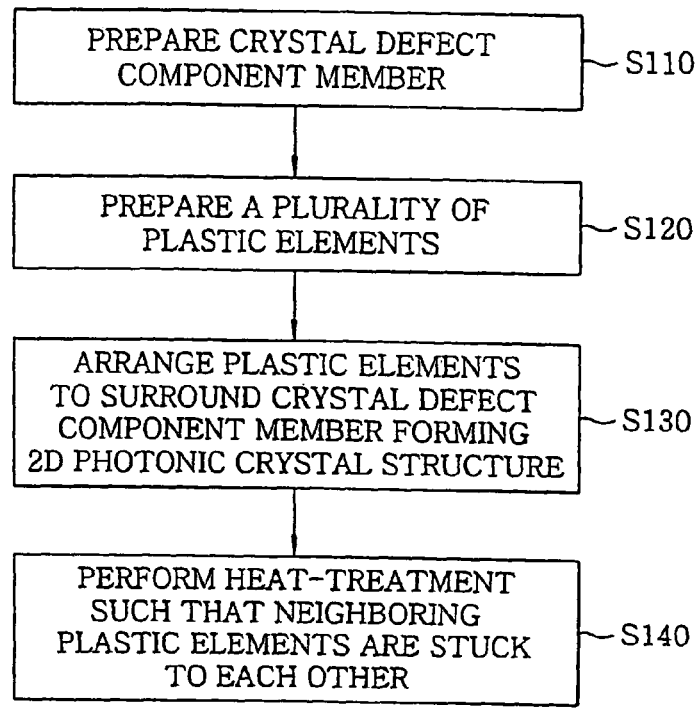
FIG. 5 offers a block diagram illustrating a method for fabricating a PPCF in accordance with a fourth preferred embodiment of the present invention.

Referring to FIG. 5, there is illustrated a block diagram describing a process for fabricating a PPCF in accordance with a fourth preferred embodiment of the present invention. First, a crystal defect component member is prepared to be used in forming the crystal defect component 100 of a predetermined diameter (Step 10). Then, a plurality of plastic elements 30 of a predetermined diameter is prepared (Step 20). Next, the plurality of plastic elements 30 are arranged to surround the crystal defect component member, forming a 2D photonic crystal structure having a predetermined lattice constant (Step 30). Thereafter, a heat-treatment is performed at a predetermined temperature so that the neighboring plastic elements 30 are stuck to each other (Step 40).

The fourth preferred embodiment of the present invention is directed to an HID-type photonic crystal fiber having a structure as described in FIG. 1.

Since the size and the shape of the crystal defect component 100, such as the HID and the LID, depend on the number of the inserted crystal defect component members (e.g., the HDPE filament or tube, the Teflon filament or tube), PPCFs having a crystal defect component 100 with various sizes and shapes can be fabricated. The fabrication processes described so far can also be applied to a fabrication of a plastic preform for a PCF to be used in a frequency band ranging from 400 nm to 800 nm for an optical communications system.

Figure 6:
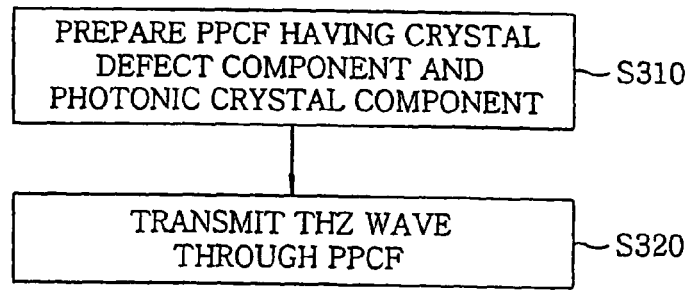
FIG. 6 depicts a block diagram providing a method for transmitting a THz wave through the use of a PPCF in accordance with a fifth preferred embodiment of the present invention.

Referring to FIG. 6, there is demonstrated a block diagram of a method for transmitting a THZ wave through a PPCF in accordance with a fifth preferred embodiment of the present invention. The PPCF includes a crystal defect component 100 having a lengthwise axis and a photonic crystal component 200 surrounding the crystal defect component 100. Herein, the photonic crystal component 200 has a 2D photonic crystal structure whose cross section perpendicular to the axis has a predetermined lattice constant. The THz wave is transmitted through the PPCF as follows. First, the PPCF formed of an array of the plurality of plastic elements 30 having a lengthwise axis is prepared, the plurality of plastic elements being arranged to build a 2-D photonic crystal structure shown in, for example, FIG. 1 or FIG. 2 (Step 310). Then, an electromagnetic wave within a THz frequency band is transmitted through the prepared PPCF (Step 320).

Figure 7:
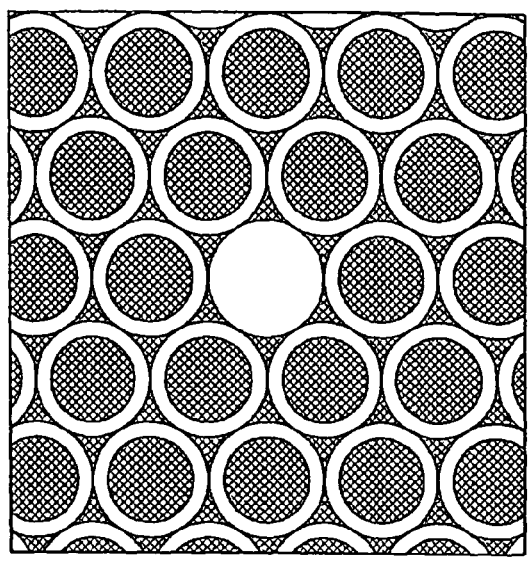
FIG. 7 illustrates a HID (high index defect) type PPCF formed of high-density polyethylene tubes having an external diameter of about 500 μm and a thickness of about 50 μm, and one high-density polyethylene filament having an external diameter of about 500 μm.

FIG. 7 shows a cross-sectional view of a PPCF implemented in accordance with one of the preferred embodiments of the present invention. The PPCF includes high-density polyethylene tubes having an external diameter of about 500 µm and a thickness of about 50 µm, and one high-density polyethylene filament having an external diameter of about 500 µm. The PPCF is of an HID type.

Figure 8:
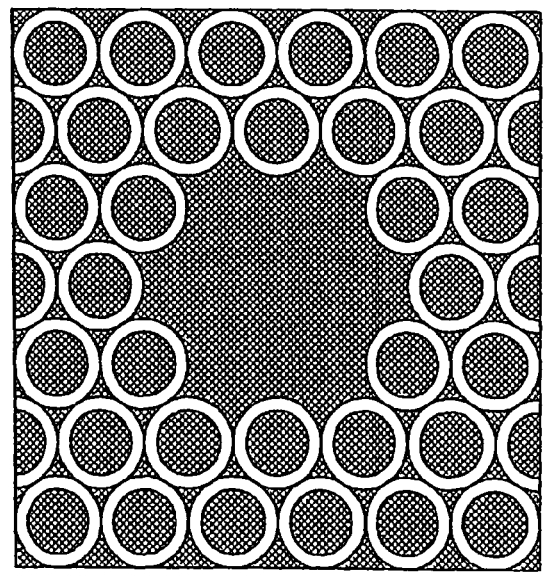
FIG. 8 shows an LID (low index defect) type PPCF formed of high-density polyethylene tubes having an external diameter of about 500 μm and a thickness of about 50 μm, and seven air holes.

FIG. 8 illustrates a cross-sectional view of a PPCF of an LID type formed of high-density polyethylene tubes having an external diameter of about 500 μm and a thickness of about 50 μm, and seven air holes.

Figure 9:
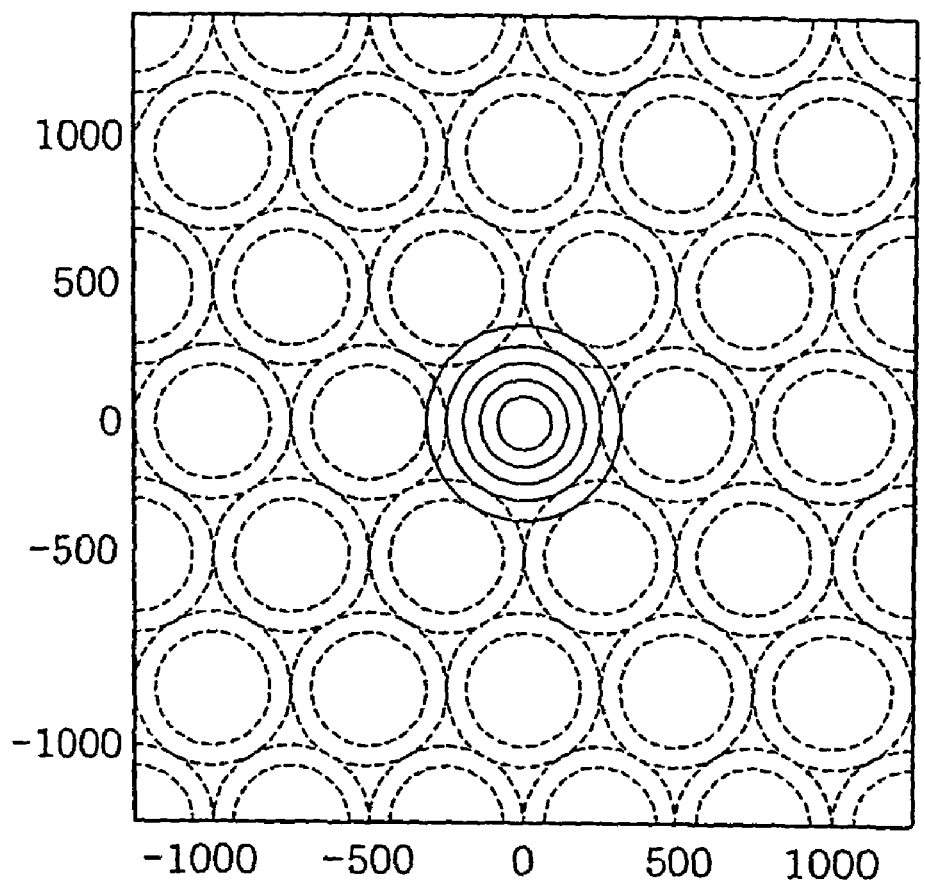
FIG. 9 sets forth a graph showing an electric field distribution of a fundamental guided mode on the 2D triangular structure of the PPCF in FIG. 7.

Referring to FIG. 9, there is provided a graph showing an electric field distribution, which is calculated by using numerical analysis, of a fundamental guided mode on the 2D triangular structure of the PPCF fiber shown in FIG. 7. Herein, it is assumed that data shown in FIG. 9 is calculated at a frequency of 1 THz. It is shown here that most of the THz waves are centered around the crystal defect component having a high refractive index.

Figure 10:
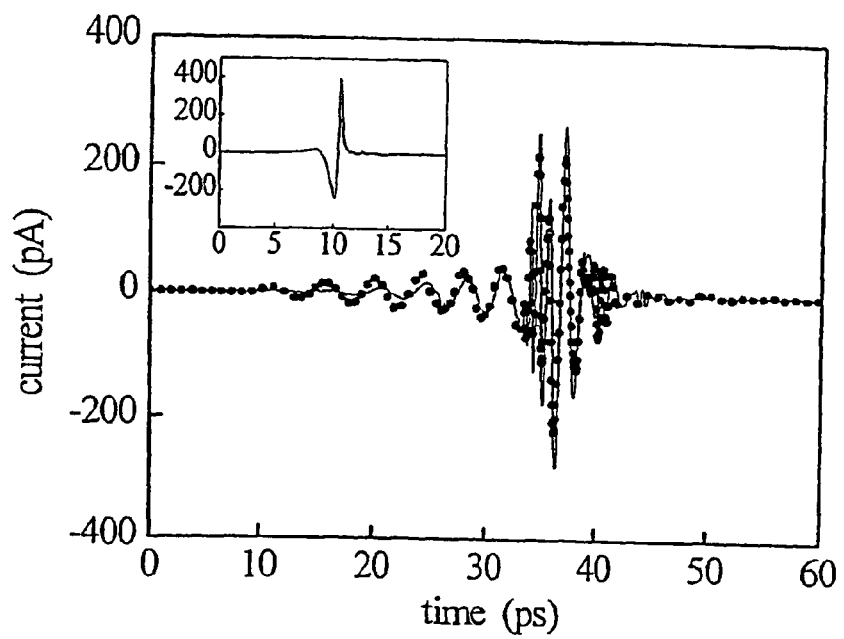
FIG. 10 demonstrates a result of a THz wave transmission test using the PPCF in FIG. 7.

FIG. 10 provides a result of a THz wave transmission test using the PPCF in FIG. 7. In the measurement, a THz pulse having a pulse width of about 1 ps was used as an incident wave. A small graph in the main graph of FIG. 10 shows a wave profile of that pulse. As can be seen in FIG. 10, the pulse waveform of the incident wave was distorted after passing through the PPCF due to a material dispersion of the high-density polyethylene and an waveguide dispersion. Further, FIG. 10 also shows that the measured values (marked as dots in FIG. 10) are coincident with theoretical values (marked as a solid line in FIG. 10) expected on the basis of numerical analysis for the PPCF.

Figure 11:
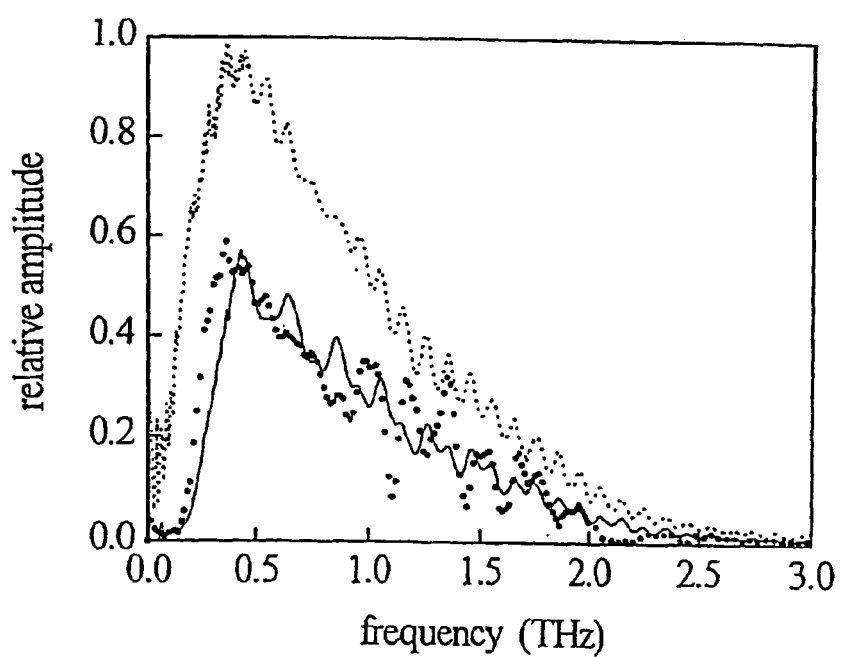
FIG. 11 depicts a spectrum of a THz pulse transmitted through the PPCF in FIG. 7.

Referring to FIG. 11, there is provided a spectrum of a THz pulse transmitted through the PPCF shown in FIG. 7. It can be clearly seen in FIG. 11 that the THz waves were well transmitted across a wide range of frequency band ranging from 0.2 to 3 THz, though the level of the spectrum was smaller than expected. The loss of the THz waves observed in the test seems to be largely caused by a mode mismatch and a reflection that occur while the incident THz waves are converted to a waveguide mode. Thus, a genuine loss of the THz waves occurring while they are transmitted through the PPCF is considered to be smaller than that observed in the test. The high-density polyethylene used in the fabrication of the PPCF is one type of polyethylene. In general, the absorption coefficient for the THz waves depends on the type of the polyethylene involved. It is known that the polyethylene has an extinction coefficient of $10^{-3}$ or less in a THz frequency band ranging from 0.1 to 10 THz (Millimeter and Submillimeter Wave Spectroscopy of Solids. ed by F. Gruner), exhibiting a far lower absorption coefficient than other plastic materials. Accordingly, in case the PPCF is fabricated by using the high-density polyethylene, the PPCF may have a transmission loss much smaller than that of any conventional waveguide. Particularly, the use of the high-density polyethylene photonic crystal fiber having an air LID, which has been disclosed in one of the above-described preferred embodiments of the present invention, may produce a waveguide having an extremely low loss.

Figure 12:
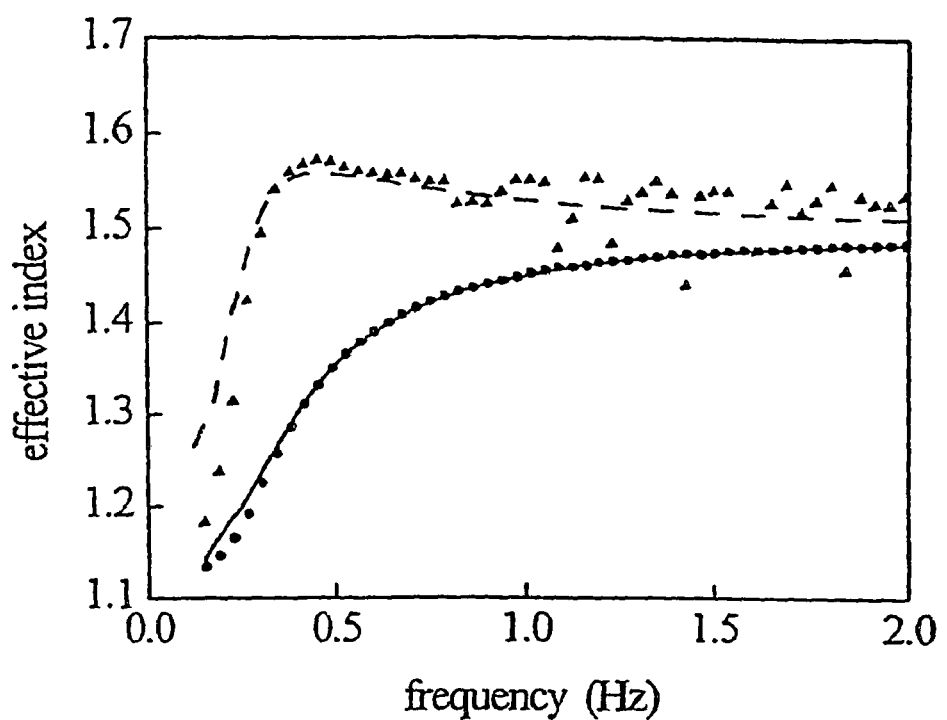
FIG. 12 offers a graph of an effective index and a group index of an HID type PPCF at a THz frequency range.

Referring to FIG. 12, there is depicted a graph showing an effective index (circular dots in FIG. 12) and a group index (triangular dots in FIG. 12) of the HID photonic crystal fiber in a THz frequency band. As shown in FIG. 12, the measured values are coincident with the numerical analysis results (represented by a broken line and a solid line in FIG. 12) and the measured values are found to be approaching a refractive index of 1.5, which is the refractive index of the high-density polyethylene, as the frequency increases. Such tendency well accords with a theoretical prediction that the THz waves will become more confined to the crystal defect component as the frequency increases.

As can be seen from the above descriptions of the test results, a waveguide having a highly improved low loss characteristic for use in the THz frequency band can be obtained by using the high-density polyethylene photonic crystal fiber.

Further, the test results also show that the PPCF in accordance with the present invention can be used as a flexible connection waveguide between THz devices or systems. Still further, since the high-density polyethylene photonic crystal fibers for the THz frequency band can be readily fabricated and analyzed, it is expected that they can contribute to design, verification and theoretical development of the photonic crystal fiber for use in the optical communication systems, which is comparatively difficult to be fabricated. Furthermore, the fabrication method for the high-density polyethylene photonic crystal fiber in accordance with the present invention can be directly applied to the fabrication of a preform for a PPCF for use in the optical communication systems.

The PPCF in the present invention can be employed as a plastic preform to produce a PPCF for the optical communication system. Conventionally, a plastic optical fiber (POF) used in a local area communication system is made of polymethylmethacrylate (PMMA), polystyrene (PS), polycarbonate (PC), or the like. These materials have a refractive index of about 1.5 to 1.6 and an attenuation coefficient of several hundred dB/km in a frequency band ranging from 400 to 800 nm (Plastic Optical Fibers, Andreas Weinert, Publicis MCD verlag, Erlagen and Munich, 1999). One of various POF fabrication methods includes a series of steps of preparing a preform having a diameter of more than several cm's by employing the above-identified materials, placing the prepared preform in a furnace and, then, performing a drawing process.

Accordingly, it is possible to use the PPCF for the THz frequency band fabricated in accordance with the present invention as the preform for fabricating, by using the above-cited proper materials, the PPCF for use in the optical communication whose frequency band ranges from 400 to 800 nm. In this case, the radius of the whole photonic crystal fiber should be adjusted so that the lattice constant of the photonic crystal structure fits to the frequency band of about 400 to 800 nm.

The PPCF for the THz transmission and the fabrication method therefor are not just limited to the above illustrated preferred embodiments but can be modified in various ways.

For example, the material for the crystal defect component and the photonic crystal component can be modified, if required, along with the crystal structure of the photonic crystal component.

As described above, by using the PPCF and the fabrication method therefor, and, further, the method for transmitting the THz wave through the use of the PPCF in accordance with the present invention, a fabricable, cost-effective and flexible waveguide exhibiting a highly improved low loss characteristic for use in the THz frequency band can be obtained. Thus obtained waveguide has a wide range of application.

While the invention has been shown and described with respect to the preferred embodiments, it will be understood by those skilled in the art that various changes and modifications may be made without departing from the spirit and scope of the invention as defined in the following claims.

What is claimed is:

1. A method for transmitting a terahertz wave through a plastic photonic crystal fiber, comprising the steps of:
   preparing the plastic photonic crystal fiber including a crystal defect component having a longitudinal axis and a photonic crystal component surrounding the crystal defect component, wherein the photonic crystal component includes an array of a plurality of plastic elements forming a 2D photonic crystal structure having a cross-section perpendicular to the longitudinal axis has a predetermined lattice constant; and transmitting an electromagnetic wave within a terahertz wave range through the plastic photonic crystal fiber, wherein the plurality of plastic elements of the photonic crystal component are made of plastic having an extinction coefficient greater than 0 and equal to or lower than $10^{-2}$ in the terahertz wave range.

2. The method of claim 1, wherein the plurality of plastic elements of the photonic crystal component are made of high-density polyethylene.

3. The method of claim 1, wherein the plurality of plastic elements of the photonic crystal component includes either one of a plurality of plastic tubes and a multiplicity of plastic filaments.

4. The method of claim 3, wherein the 2D photonic crystal structure of the photonic crystal component has the predetermined lattice constant smaller than several millimeters.

5. The method of claim 4, wherein the 2D photonic crystal structure of the photonic crystal component is a triangular lattice, a square lattice, a honeycomb lattice or a Kagome lattice.

6. The method of claim 5, wherein the photonic crystal component further includes extra plastic elements having a radius or a thickness different from those of the plurality of plastic elements forming the lattice structure, the extra plastic element being inserted into each of interstitial positions of the lattice structure whereby a modified 2D photonic crystal structure is obtained.

7. The method of claim 1, wherein the crystal defect component has a refractive index lower than that of the photonic crystal component.

8. The method of claim 7, wherein the size of a cross-section of the crystal defect component is equal to or larger than the size of a cross-section of a unit including at least one central element and six ambient elements surrounding the central element in the 2D photonic crystal structure.

9. The method of claim 1, wherein the crystal defect component has a refractive index higher than that of the photonic crystal component.

10. The method of claim 9, wherein the crystal defect component includes at least one plastic element having an extinction coefficient greater than 0 and equal to or lower than $10^{-2}$ in a terahertz frequency range.

11. The method of claim 10, wherein said at least one plastic element forming the crystal defect component is at least one high-density polyethylene tube or filament.

* * * * *